United States Patent Office 3,830,726
Patented Aug. 20, 1974

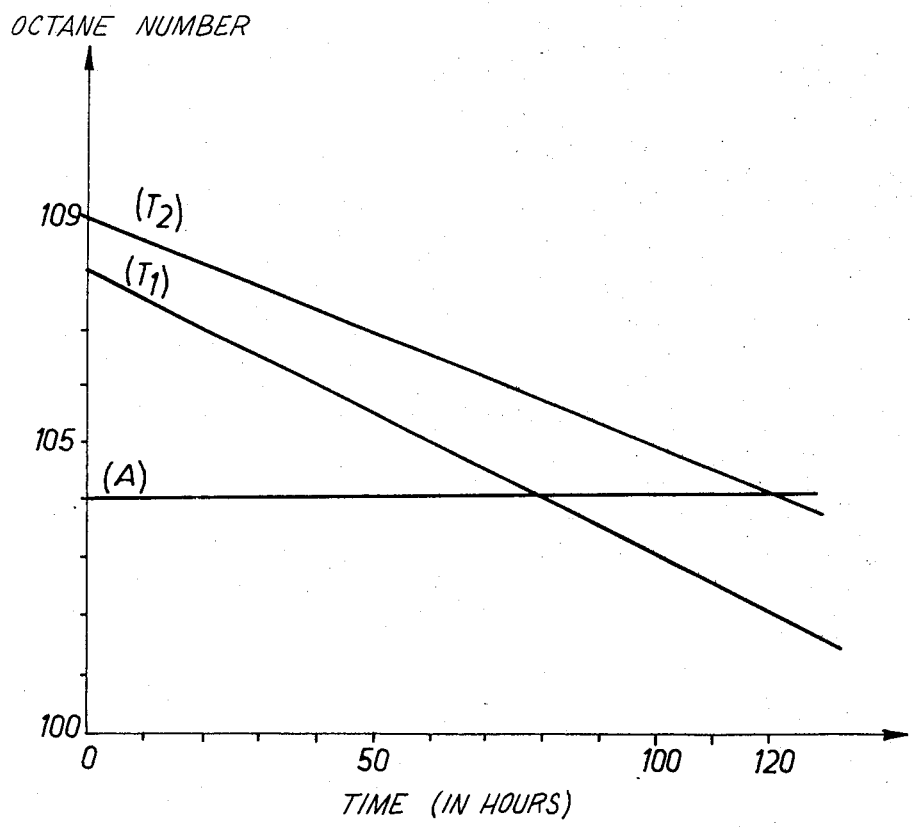

3,830,726
REFORMING WITH A TRIMETALLIC CATALYST
Joseph Edouard Weisang and Philippe Engelhard, Le Havre, France, assignors to Compagnie Francaise de Raffinage, Paris, France
Filed Aug. 10, 1971, Ser. No. 170,583
Claims priority, application France Aug. 14, 1970, 7029985
Int. Cl. C10g 35/08
U.S. Cl. 208—138                                    1 Claim

ABSTRACT OF THE DISCLOSURE

Novel catalysts for reforming hydrocarbon fractions in the presence of hydrogen and novel applications of these and similar catalysts are disclosed. These are useful for improving the octane number of petroleum distillates. The catalysts are a combination of the platinum group metals with tin and rhenium, and possibly a combined halogen. The method of using these catalysts and similar ones using lead in place of tin are disclosed.

---

The present invention relates to catalysts intended for refining petroleum products and, more particularly, the reforming of such products.

Reforming is a process for increasing the octane number of petroleum distillates intended for the manufacture of gasolines.

The most widely used process at the present time is a catalytic process in which the metallic contact mass of the catalyst deposited on a support, such as alumina, comprises platinum. The presence of this metal makes it possible to operate at a relatively low pressure. This results in high yields without bringing about cracking reactions of the charge. This, therefore, avoids the necessity of frequently regenerating the catalyst by the burning off of the coke deposited on it.

Obtaining reformed gasolines, whose octane number would be sufficient to permit the direct use of these gasolines without the addition of tetraethyl lead, would be of great interest since, on the one hand, it would avoid the addition of an additive to the gasolines and, on the other hand, it would reduce air pollution by facilitating the elimination of the toxic gases contained in the exhaust of engines. However, one cannot practically obtain such gasolines directly by reforming by simply increasing the catalytic mass of the platinum because this metal is very expensive.

The present invention is specifically directed to providing reforming catalysts which yield gasolines of stable, high octane number.

In their earlier copending application, Ser. No. 11,325, filed on Feb. 2, 1970, applicants described reforming catalysts whose metals consist of at least one metal of the platinum group and at least one metal belonging to the group consisting of lead and tin, deposited on a support of refractory mineral oxide having acid sites. The disclosure of said copending application is incorporated herein by reference. In this specification, metals of the platinum group are: ruthenium, rhodium, palladium, osmium, iridium, and platinum.

Catalytic compositions which comprise a refractory mineral support on which platinum and rhenium are deposited are also known to constitute hydroreforming catalysts.

The presence of halogen, in combined form, is beneficial in the composition of reforming catalysts which are used in the presence of hydrogen. The halogen used is generally chlorine. It is present in an amount, calculated solely with reference to the halogen as an element, of generally between 0.5% and 3.0%, and preferably between 0.6% and 1.6%, referred to the total weight of the catalyst.

The addition of other metals to the catalysts described above in certain cases results in excellent reforming catalysts.

One embodiment of the present invention concerns the use of catalysts in reforming hydrocarbon fractions in the presence of hydrogen which comprise a support of refractory mineral oxide of a specific surface of more than 15 m.$^2$/g. and of a specific pore volume of more than 0.1 cm.$^3$/g., which has acid sites, and on which there are deposited metals, in free or combined form, as follows:

(a) 0.02% to 2% of at least one metal of the platinum group, and preferably 0.1% to 0.7%;

(b) 0.02% to 2% of at least one metal of the group consisting of lead and tin, and preferably 0.05% to 0.6%;

(c) 0.02% to 2% of rhenium, and preferably, 0.05% to 0.6%, the said hydrocarbon fractions having a sulfur content of less than 10 p.p.m. and a boiling point of between 50 and 250° C. at atmospheric pressure. The foregoing percentages refer to the total weight of the catalyst.

Another aspect of the present invention concerns a catalyst comprising a support of refractory mineral oxide of a specific surface of more than 15 m.$^2$/g. and a specific pore volume of more than 0.1 cm.$^3$/g., which has acid sites and on which metals are deposited in free or combined form as follows:

(a) 0.02% to 2% of at least one metal of the platinum group, and preferably 0.1% to 0.7%;

(b) 0.02% to 2% acid preferably 0.05% to 0.6% of at least one metal of the group consisting of tin and lead;

(c) 0.02% to 2% of rhenium, and preferably 0.05% to 0.06%, with all percentages being referred to the total weight of the catalyst.

The catalyst supports in accordance with the invention must be refractory substances of sufficient specific surface and sufficient pore volume. The substances must, furthermore, be of an acid character since it is known that the isomerization reactions of the charge take place on acid sites. Alumina, as well as the aluminosilicates, are particularly well-suited for such supports.

Thus, for instance, one can employ as a support an alumina whose specific surface is between 15 and 350 m.$^2$/g. and whose pore volume is more than 0.1 cc. per gram. It is advantageous to use these supports in the form of beads of substantially constant diameter, the latter having any value close to between 1 mm. and 10 mm.

Catalysts can be prepared by the customary processes. The method described in the aforementioned patent application of impregnating the support with solutions containing the elements to be deposited, can advantageously be used. The acidity of the support can be modified before depositing the metals. The metals can be deposited simultaneously or successively. When one of the components is platinum, the platinum is, in general, deposited from the solution containing only said element as a metallic compound.

The most advantageous catalysts are those whose contents by weight of rhenium, metals of the platinum group, and metals belonging to the group formed of tin and lead, are between 0.05% and 0.6%, 0.1% and 0.7%, 0.05% and 0.6%, respectively. Among the metals of the platinum group, platinum gives the best results.

Applicants have obtained very good results by passing a charge of normal heptane over catalysts prepared in accordance with the present invention. These results can be extended to a charge which is any cut having a boiling point of between 50 and 250° C. and intended for the manufacture of gasoline of high octane number.

This charge can be previously desulfurized in such a manner that the sulfur content is less than 10 p.p.m. and preferably less than 1 p.p.m.

The catalyst may be activated during the reforming by addition of a halide (for example, a chloride) to the charge. It may also be advantageous to presulfurize the catalyst, for instance by a stream of hydrogen sulfide, so as to limit the cracking reactions which tend to occur during the initial hours of operation of the catalyst.

The invention is illustrated by the following examples, which are not limitative in character:

EXAMPLE I

Reforming catalysts are prepared; the supports for which are composed of alumina, which latter has the following characteristics determined by the B.E.T. method (Brunauer, Emmett, and Teller):

Specific surface _____ 174 m.²/g.
Specific pore volume _____ 0.74 cc./g.
Average pore radius _____ 85 A.

The pore radii distribution is such that most of the pores have a radius of between 30 and 150 A. The alumina is present in the form of regular and uniform beads of a diameter ranging from 1 mm. to 2 mm. It is calcined at 600° C. for eight hours before being contacted with the impregnation solutions.

10 cc. of a solution containing 0.229 grams of rhenium chloride ($ReCl_3 \cdot 6H_2O$) in pure hydrochloric acid is prepared. This solution is diluted to 125 cc. with distilled water and then contacted with 50 grams of support. After drying and then calcining for two hours at 550° C., the impregnated alumina is treated for 24 hours with a flowing 1/10 N hydrochloric acid solution. After drying, the alumina is dipped into a solution of hexachloroplatinic acid ($H_2PtCl_6 \cdot 6H_2O$). The catalyst is dried and then calcined at 400° C. for three hours. The composition of the catalyst $T_1$, which has thus been prepared, expressed in percentage of the total weight of the catalyst, is as follows:

Platinum _____ 0.36
Rhenium _____ 0.21
Chlorine _____ 1.41

A second reforming catalyst $T_2$ is prepared starting from a support identical to that described above and using a similar process, but the first impregnation solution comprises 0.189 grams of tin chloride ($SnCl_2 \cdot H_2O$) instead of 0.229 grams of rhenium chloride.

The catalyst $T_2$ obtained has the following composition expressed in percentages of the total weight of the catalyst:

Platinum _____ 0.35
Tin _____ 0.19
Chlorine _____ 1.35

A catalyst A in accordance with the present invention is prepared by a process similar to that described above. The first impregnation solution contains 0.189 grams of tin chloride ($SnCl_2 \cdot H_2O$) and 0.229 grams of rhenium chloride ($ReCl_3 \cdot 6H_2O$).

The catalyst A obtained has the following composition expressed in percentage of the total weight of the catalyst:

Platinum _____ 0.34
Tin _____ 0.20
Rhenium _____ 0.21
Chloride _____ 0.91

The control catalysts $T_1$ and $T_2$, as well as the invention catalyst A, are subjected to the following catalytic test:

A gaseous stream of hydrogen saturated with normal heptane (by bubbling hydrogen into heptane at 20° C.) passes at a temperature of 520° C. at atmospheric pressure over 2 cc. of catalyst placed in a small reactor. The sulfur content of the normal heptane is less than 1 p.p.m.; the hourly space speed of the gaseous mixture (volume of gas passing per hour over a unit volume of catalyst) is equal to 80.

The proportion of heptane in the stream of gas is equal to 2.5%. The efflux of the reactor is analyzed by gaseous phase chromotography.

The results obtained with catalysts $T_1$, $T_2$, and A appear in Table I.

TABLE I

| Catalyst | Characteristic values of the efflux (percent weight of the charge) | Operating time (hours) | | | |
|---|---|---|---|---|---|
| | | 1 | 3 | 5 | 7 |
| $T_1$ | $C_1$-$C_4$ | 33.7 | 37.5 | 38.5 | 37.7 |
| | $nC_7$ | 3.5 | 5.6 | 7.6 | 10.6 |
| | $C_5$+ (other than $nC_7$) | 62.8 | 56.9 | 53.9 | 51.7 |
| | R.O.N. (Research octane number) | 107.3 | 104.2 | 98.4 | 92.3 |
| $T_2$ | $C_1$-$C_4$ | 14.8 | 13.1 | 14.0 | 16.3 |
| | $nC_7$ | 0 | 0 | 0 | 0 |
| | $C_5$+ (other than $nC_7$) | 85.2 | 86.9 | 86.0 | 83.7 |
| | R.O.N. (Research octane number) | 122.3 | 122.4 | 121.1 | 120.8 |
| A | $C_1$-$C_4$ | 16.3 | 18.0 | 17.8 | 18.3 |
| | $nC_7$ | 0 | 0.9 | 1.2 | 2.1 |
| | $C_5$+ (other than $nC_7$) | 83.7 | 81.1 | 81 | 79.6 |
| | R.O.N. (Research octane number) | 119.4 | 117.3 | 117.1 | 114.9 |

There have been indicated for each catalyst at four moments during operation, the values:

Of the composition of the efflux having hydrocarbons of four or less carbon atoms (this is a measure of the cracking of the charge);

Of the remaining normal heptane (the difference to make up 100 is a measure of the conversion of the charge);

Of hydrocarbons having five or more carbon atoms (other than unconverted normal heptane);

Of the research octane number; this is calculated on basis of the composition of the efflux after removal of the hydrocarbons having four or less carbon atoms.

The analysis of the results listed in Table I shows that catalyst A, in accordance with the invention, is a good reforming catalyst in the presence of hydrogen.

EXAMPLE II

The control catalysts $T_1$ and $T_2$, as well as the catalyst A prepared in accordance with the processes described in Example I, are subject to the following catalytic test intended to compare the speeds of deactivation of the catalysts when they are operating under identical conditions. It was attempted to operate with a stable yield close to 50 percent expressed by weight of normal heptane introduced.

A mixture of hydrogen and normal heptane in a molar ratio of 8 at a pressure of 9 bars passes over 30 cc. of catalyst at a temperature of 500° C. with an hourly space velocity of liquid heptane equal to 1. The initial sulfur content of the normal heptane is less than 1 p.p.m.

In the accompanying FIG. 1, there are given curves showing the change in the research octane number, calculated on the efflux, as a function of the number of hours of operation. The curves are straight lines.

We limited ourselves to the first 120 hours. The slope of the straight lines is a measure of the speed of deactivation of the catalysts. The yields of hydrocarbons of five or more carbon atoms, expressed in percentage of the weight of the normal heptane introduced into the reactor, for all practical purposes do not vary under the experimental conditions. They are equal to 49.1% in the case of catalyst A, to 53.3% in the case of catalyst $T_1$, to 53.0% in the case of catalyst $T_2$.

Catalyst A, in accordance with the invention, is therefore a reforming catalyst in the presence of hydrogen which gives very satisfactory performance, when said performance is compared with the performance of the catalysts $T_1$ and $T_2$. The absence of deactivation under the conditions of the experiment is a particularly interesting, surprising, and advantageous result.

EXAMPLE III

A reforming catalyst B is prepared from an alumina in the form of extruded products, the properties of which are as follows:

Average diameter of the extruded products . 1.5 mm.
Specific surface _____ 190 m.²/g.
Volume _____ 0.51 cm.³/g.
Average pore radius _____ 53 A.

This alumina is calcined at a temperature of 600° for four hours.

PREPARATION OF CATALYST B 0.32 g. of lead nitrate are dissolved in 250 cc. of distilled water containing 10 cc. of pure nitric acid. Thereupon 100 g. of alumina, previously described, are immersed in said solution. The entire quantity is placed in a rotary evaporator, then dried and, finally, calcined for two hours at 600° C.

Thereupon, there are prepared 250 cc. of a solution containing:

20.4 cc. of a perrhenic acid solution containing 9.8 grams of rhenium per liter.

36.8 cc. of a hexachloroplatinic acid solution containing 9.5 grams per liter of platinum.

50 cc. of normal hydrochloric acid.

This solution is circulated for one hour over lead-impregnated alumina. Thereupon, it is placed in a rotary evaporator, dried, and then calcined for three hours at 400° C.

The composition of catalyst B, in components other than alumina, is as follows:

| | Percent |
|---|---|
| Platinum | 0.35 |
| Rhenium | 0.19 |
| Lead | 0.20 |
| Chlorine | 1.31 |

The percentages relate to the elements and are referred to the total weight of the catalyst.

CATALYTIC TEST

The catalytic test is identical to that described in Example I.

The results obtained in two tests carried on catalyst B are set forth in Table II.

TABLE II

| Catalyst B characteristic values of the efflux (percent weight of the charge) | Operating time (hours) | | | |
|---|---|---|---|---|
| | 1 | 3 | 5 | 7.5 |
| First test: | | | | |
| $C_1$-$C_4$ | 23.2 | 19.8 | 19.5 | |
| $nC_7$ | 0.6 | 0.8 | 0.5 | |
| $C_5+$ (other than $nC_7$) | 76.2 | 79.4 | 80.0 | |
| R.O.N. (Research octane number) | 118.4 | 116.4 | 117.0 | |
| Second test: | | | | |
| $C_1$-$C_4$ | 19.4 | 20.2 | 21.5 | 22.6 |
| $nC_7$ | 0 | 0.5 | 1.0 | 3.1 |
| $C_5+$ (other than $nC_7$) | 80.6 | 79.3 | 77.5 | 74.3 |
| R.O.N. (Research octane number) | 119.8 | 117.8 | 116.8 | 110.7 |

Analysis of the results set forth in Table II shows that catalyst B is a good reforming catalyst in the presence of hydrogen.

We claim:

1. In a method of reforming hydrocarbon fractions in the presence of hydrogen, the improvement comprising the use of a catalyst comprising a support of a porous refractory, inorganic oxide having specific surface of more than 15 m.²/g., specific pore volume of more than 0.1 cc./g., and having an acid character and on said support 0.1% to 0.7% of at least one metal of the platinum group;

0.05% to 0.6% of at least one metal of the group consisting of lead and tin; and 0.05% to 0.6% of rhenium, substantially all of said rhenium having an elevated oxidation state, where said percentages refer to the total weight of the catalyst, and the said hydrocarbon fractions have a sulfur content of less than 10 p.p.m. and a boiling point of between 50° C. and 250° C. at atmospheric pressure, said catalyst having been formed by impregnating said support with an acid solution comprising a compound of (1) tin or lead and (2) a compound of rhenium; drying and calcining said impregnated support; treating said support with acid solution and then drying it; thereafter impregnating said support with an acid solution of a compound of a metal of the platinum group, and then drying and calcining the impregnated support.

References Cited
UNITED STATES PATENTS

| 3,415,737 | 12/1968 | Kluksdahl | 208—139 |
| 2,861,959 | 11/1958 | Thorn et al. | 252—465 |
| 3,511,888 | 5/1970 | Jenkins | 260—673.5 |
| 3,631,215 | 12/1971 | Clippinger et al. | 208—138 |
| 3,576,766 | 4/1971 | Rausch | 252—466 PT |
| 3,558,523 | 1/1971 | Rausch | 252—466 PT |
| 3,649,565 | 3/1972 | Wilhelm | 252—466 PT |
| 3,702,294 | 11/1972 | Rausch | 208—139 |
| 3,692,701 | 9/1972 | Box | 260—680 R |

HERBERT LEVINE, Primary Examiner

U.S. Cl. X.R.

208—139; 252—466 PT